US007248740B2

(12) United States Patent
Sullivan

(10) Patent No.: US 7,248,740 B2
(45) Date of Patent: Jul. 24, 2007

(54) METHODS AND SYSTEMS FOR PREVENTING START CODE EMULATION AT LOCATIONS THAT INCLUDE NON-BYTE ALIGNED AND/OR BIT-SHIFTED POSITIONS

(75) Inventor: Gary J. Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 10/418,735

(22) Filed: Apr. 18, 2003

(65) Prior Publication Data

US 2004/0030665 A1 Feb. 12, 2004

Related U.S. Application Data

(60) Provisional application No. 60/374,192, filed on Apr. 19, 2002.

(51) Int. Cl.
G06K 9/36 (2006.01)
G06K 9/46 (2006.01)

(52) U.S. Cl. .................. 382/232; 382/233; 382/244

(58) Field of Classification Search ............. 382/232, 382/233, 244, 246; 341/55, 94
See application file for complete search history.

(56) References Cited

U.S. PATENT DOCUMENTS

| 4,847,877 | A | | 7/1989 | Besseyre |
| 4,982,270 | A | | 1/1991 | Tanaka et al. |
| 5,606,539 | A | | 2/1997 | De Haan et al. |
| 5,608,697 | A | | 3/1997 | De Haan et al. |
| 5,661,665 | A | | 8/1997 | Glass et al. |
| 5,740,310 | A | | 4/1998 | De Haan et al. |
| 5,784,110 | A | | 7/1998 | Acampora et al. |
| 5,784,631 | A | * | 7/1998 | Wise ............... 382/246 |
| 5,796,743 | A | | 8/1998 | Bunting et al. |
| 5,835,144 | A | | 11/1998 | Matsumura et al. |
| 5,844,867 | A | | 12/1998 | De Haan et al. |
| 5,870,444 | A | | 2/1999 | Mynett et al. |
| 5,898,897 | A | | 4/1999 | Son et al. |
| 5,930,395 | A | | 7/1999 | Nagai et al. |
| 5,946,043 | A | | 8/1999 | Lee et al. |
| 5,955,977 | A | * | 9/1999 | Lei ............... 341/107 |
| 5,956,090 | A | | 9/1999 | Yamauchi |

(Continued)

FOREIGN PATENT DOCUMENTS

EP 0 886 398 A1 12/1998

(Continued)

OTHER PUBLICATIONS

Anonymous, "DivX Multi Standard Video Encoder," 2 pp.

(Continued)

Primary Examiner—Phuoc Tran
(74) Attorney, Agent, or Firm—Klarquist Sparkman, LLP

(57) ABSTRACT

Methods and systems provide approaches to start code emulation prevention at a granularity higher than the bit level. In various embodiments, start code emulation prevention can occur at locations other than data boundaries such as byte boundaries and the like. These embodiments can be used in connection with systems that do not always preserve data alignment boundaries in the data that is processed. In some systems, the described techniques can provide a basis from which decoder systems can recover in the event that data boundaries are lost.

43 Claims, 6 Drawing Sheets

U.S. PATENT DOCUMENTS

| | | | |
|---|---|---|---|
| 5,970,173 | A | 10/1999 | Lee et al. |
| 6,075,576 | A | 6/2000 | Tan et al. |
| 6,266,158 | B1 | 7/2001 | Hata et al. |
| 6,330,214 | B1 | 12/2001 | Ohta et al. |
| 6,873,629 | B2 | 3/2005 | Morris |
| 2003/0146855 | A1 | 8/2003 | Sullivan et al. |

FOREIGN PATENT DOCUMENTS

| | | |
|---|---|---|
| EP | 0 948 214 A2 | 10/1999 |
| EP | 1 018 840 A2 | 7/2000 |
| EP | 1 043 892 A1 | 10/2000 |
| EP | 1 069 777 A1 | 1/2001 |
| EP | 1 079 631 A1 | 2/2001 |
| EP | 1 111 932 A2 | 6/2001 |
| WO | WO 99/56472 | 11/1999 |
| WO | WO 00/56077 | 9/2000 |
| WO | WO 00/64186 | 10/2000 |

OTHER PUBLICATIONS

ISO/IEC, "ISO/IEC 13818-1: Information Technology—Generic Coding of Moving Pictures and Associated Audio Information: Systems," 171 pp. (2000).

Sullivan, "On Random Access and Bitstream Format for JVT Video," Joint Video Team (JVT) of ISO/IEC MPEG & ITU-T VCEG (ISO/IEC JTC1/SC29/WG11 and ITU-T SG16 Q.6), Document JVT-B063, 6 pp. (Jan.-Feb. 2002).

Sullivan et al., "The H.264/AVC Advanced Video Coding Standard: Overview and Introduction to the Fidelity Range Extensions," 21 pp. (Aug. 2004).

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

Joint Video Team of ISO/IEC MPEG and ITU-T VCEG, "Study of Final Committee Draft of Joint Video Specification (ITU-T Rec. H.264, ISO/IEC 14496-10 AVC," 257 pp. (Document dated Dec. 2002) [Downloaded from the World Wide Web on May 6, 2005].

Joint Video Team of ISO/IEC MPEG and ITU-T VCEG, "Joint Model No. 1, Revision 1 (JM-1r1)," 80 pp. (Document dated Jan. 2002) [Downloaded from the World Wide Web on May 6, 2005].

ITU-T, "ITU-T Recommendation H.320: Infrastructure of Audiovisual Services-Systems and Terminal Equipment for Audiovisual Services: Narrow-band Visual Telephone Systems and Terminal Equipment," 31 pp. (1999).

ISO/IEC, "ISO/IEC 13818-2: Information Technology—Generic Coding of Moving Pictures and Associated Audio Information: Video—Amendment 1: Content Description Data," 23 pp. (Document dated Dec. 2001).

Suzuki et al., "Tool to Support Random Access," ITU-T document VCEG-O53, Study Group 16, Question 6, 3 pp. (Document dated Dec. 2001) [Downloaded from the World Wide Web on May 6, 2005].

Suzuki et al., "Group of Pictures for JVT Codec," ITU-T document JVT-B069, Study Group 16, Question 6, 4 pp. (Document dated Jan. 2002) [Downloaded from the World Wide Wed on May 6, 2005].

Suzuki, "AHG Report: GOP Syntax," ITU-T document JVT-B017, Study Group 16, Question 6, 1 p. (Document dated Dec. 2002) [Downloaded from the World Wide Web on May 6, 2005].

Sullivan, "Header-Level Needs for H.26L," ITU-T, Study Group 16, Questions 15/16, 6 pp. [Downloaded from http://ftp3.itu.ch/av-arch/video-site/0011_Gen/ on Aug. 17, 2005; document last updated on Nov. 12, 2000].

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Mar. 16, 2004].

ITU-T, "ITU-T Recommendation H.261: Video Codec for Audio-visual Services at $p$ x 64 kbits," 28 pp. (1993).

ITU-T, "ITU-T Recommendation H.262: Information Technology—Generic Coding of Moving Pictures and Associated Audio Information: Videol," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

ISO/IEC, "ISO/IEC 13818-6: Information Technology—Generic Coding of Moving Pictures and Associated Audio Information—Part 6: Extensions for DSM-CC," 574 pp. (1998).

ITU-T, "ITU-T Recommendation H.220.0: Information Technology—Generic Coding of Moving Pictures and Associated Audio Information: Systems," 171 pp. (also published as ISO/IEC 13818-1) (2000).

ISO/IEC, "ISO/IEC 13818-4: Information Technology—Generic Coding of Moving Pictures and Associated Audio Information—Part 4: Conformance testing," 79 pp. (1998).

ISO/IEC, "DSM-CC FAQ Version 1.0," 12 pp. (1997) [Downloaded from the World Wide Web on Nov. 12, 2004].

Lei, Shaw-Min, "The construction of efficient variable-length codes with clear synchronizing codewords for digital video applications," SPIE vol. 1605, Visual Communications and Image Processing '91: Visual Communications, Nov. 11, 1991, pp. 863-873.

Stockhammer, Thomas et al., "H.26L/JVT Coding Network Abstraction Layer and IP-Based Transport," Proceedings 2002 Int'l. Conference on Image Processing, ICIP 2002, IEEE, Sep. 22-Sep. 25, 2002, pp. 485-488.

Anderson, David B., "A Proposed Method for Creating VCR Functions using MPEG Streams," IEEE, 1996, pp. 380-382.

PCP-101i Time Code Processor Guide to Installation and Operation M133-9900-200, Miranda TEchnologies Inc., 1999, pp. i-vii; pp. 1-47.

Richard Williams; "How-to All in Good Timecode"; Adobe Magazine, Spring 1999, pp. 57-59.

Pennebaker et al., *JPEG Still Image Data Compression Standard*, pp. 105-106 (1993).

Wien, "Variable Block-Size Transforms for Hybrid Video Coding," Dissertation, 182 pp. (Feb. 2004).

\* cited by examiner

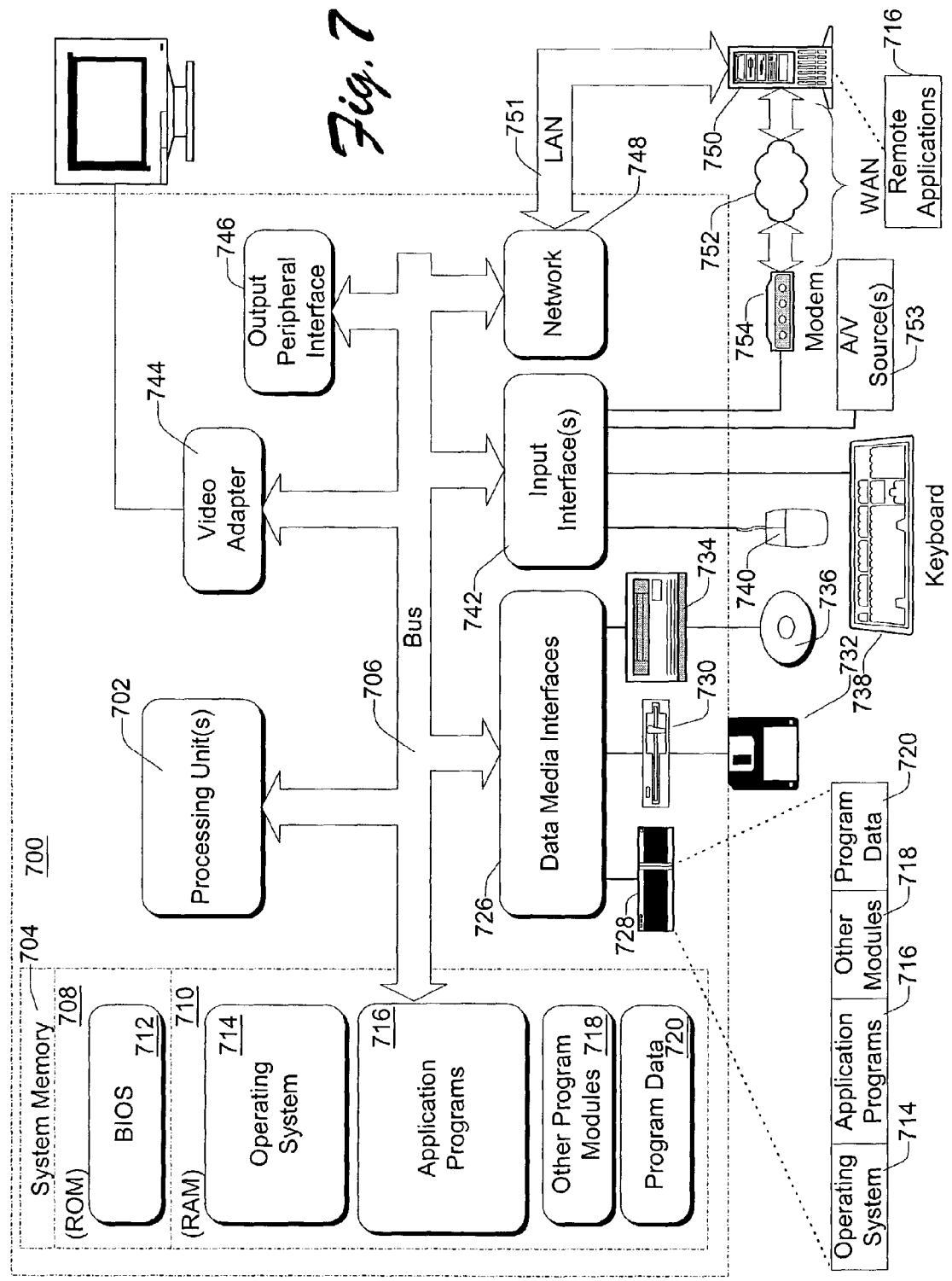

METHODS AND SYSTEMS FOR PREVENTING START CODE EMULATION AT LOCATIONS THAT INCLUDE NON-BYTE ALIGNED AND/OR BIT-SHIFTED POSITIONS

RELATED APPLICATION

This application claims the benefit of U.S. Provisional Application Ser. No. 60/374,192, filed Apr. 19, 2002.

TECHNICAL FIELD

This invention relates to methods and systems for preventing start code emulation and for data stuffing.

BACKGROUND

Digital data is typically transmitted from some type of transmitter to some type of receiver. Transmitters typically include an encoder that encodes the data for transmission; and receivers typically include a decoder that decodes data that it receives. There are different types of digital data such as video data, audio data, audio/video data, text data, computer executable program data, archival data, database information, and the like. When digital data is transmitted, it is typically transmitted in some type of channel. Equivalently, computer memory or any storage device or storage medium can be considered a transmission channel for purposes herein.

When digital data is transmitted, it is important to be able to find specific points within the data in the channel. This is done for various purposes, such as to locate points that enable recovery from errors or losses in the transmission of the data through the channel, points that enable starting the decoding process at a location other than the start of the entire stream, or points that enable searching for different types of data that are utilized for different purposes. Thus, for example, on the decoder side, decoders and other components that process digital data often need to know the context of the data so that the data can be properly processed. This would not be so important if one was able to start with the first bit that was sent and the decoder was able to run without any errors. In this situation, ideally, the decoder could simply track the information that was being sent according to knowing what the format of the data is. Unfortunately, this idealistic situation often does not occur. Errors and other contingencies do occur that present challenges to those who design and use systems that transmit and receive digital data. In some cases such as when tuning into an ongoing broadcast stream of data, the decoder cannot start at the beginning of the data transmission. Locating points by data format parsing may also require a significant amount of complex processing in a decoder.

In many types of channel environments, such issues are addressed by providing, in the data, so-called resynchronization markers. Resynchronization markers provide a mechanism by which a system can start its decoding process or recover from an error. For example, when digital data is streamed as a series of bits or bytes, having resynchronization markers in the stream can provide a decoder with a point of reference from which to recover in the event an error occurs in the transmission.

One way that resynchronization markers can be employed is in the context of start codes. A start code is a string of bits or bytes having a specific value. Generally, many systems tend to carry bytes (e.g. H.222.0/MPEG-2 Systems), so that start codes can be defined as a uniquely-valued string of bytes. The unique string of bytes provides a pattern the presence of which indicates a resynchronization point. A resynchronization point typically indicates the start or boundary of some independently decodable amount of data. For example, in H.262/MPEG-2 Video data, resynchronization points can indicate the start of a slice (i.e. an independently decodable region of a picture), the start of a picture, the start of a GOP (i.e., "Group of Pictures" or independently decodable sequence of pictures), or the start of a new video sequence. Digital video streams can also include so-called ancillary or supplemental data which can be preceded by a start code.

Sometimes, start codes are used not only within a data stream such as a video stream, but are used by a system's multiplex level. The H.222.0/MPEG-2 System specification is an example of a system that uses start codes, and carries streams of video data interleaved with system-level information and audio information.

Since start codes can be important insofar as providing resynchronization points within a data stream, it is a good idea to avoid emulating start codes in the data stream in places that are not, in fact, intended to represent start codes.

For example, consider the following. Start codes define a specific pattern of bits or bytes that can identify the start of a new unit of data. If one is sending arbitrary data in between the start codes, then it is possible that the arbitrary data may, in and of itself, contain the same pattern that one is using as a start code. For example, if one assumes that the data that is being carried is completely random, then if a start code is K bits long, the probability of accidentally emulating the start code in the bits starting at some particular bit location is $\frac{1}{2}^k$.

In some cases, the judgment can be made that if the number of bits in the start code is large, then it may be fairly unlikely for the start code to be accidentally emulated. In such a situation, if the consequences of an accidental start code emulation are not too severe, it may be judged unnecessary to take measures to ensure prevention of accidental start code emulations. This is the case with respect to some audio data formats. Typically, these formats do not utilize a very high bit rate measured in bits per second, so it is not too likely that a start code will be accidentally emulated during any particular interval of time. With respect to video data, this is generally not the case, as the bit rate is ordinarily much higher for transmission of video data.

In past major video coding standards (with perhaps one exception), the video syntax format within the data payload has been designed to avoid start code emulation. That is, if one knows what kind of data elements will make up the video syntax, then one can carefully design the syntax so that no accidental start codes can occur. For example, a start code in traditional video coding standards begins with a long string of 0-bits, followed by a 1-bit. This long string may contain 23 0-bits followed by one 1-bit. Assume that most of the data that is sent is entropy coded using variable length codes (often referred to informally as Huffman codes). Variable length codes (VLCs) are defined for example purposes herein as variable-depth tree-structured codes that are utilized to select among a set of represented symbols. One technique using binary-tree VLCs is to make sure that the path in the tree from the root to every leaf that represents a valid symbol always has a "1" in it somewhere, and that the tree structure is not too deep.

Thus, for example, if one knows that every variable length code string is no longer than 10 bits long and that every such string will have at least one 1-valued bit in it, then one knows that there is no way that a sequence of coded data from the VLC can ever contain more than 18 consecutive zero-valued bits. That is, the worst-case scenario would be 1000000000 followed by 0000000001. Thus, if one designs the syntax carefully and inspects the location of every 0- and every 1-valued bit to ascertain how many 0's can occur in a row, one can use a start code that contains a longer string of 0's than can ever occur in the syntax. For example, the syntax can be designed so that valid syntax can never contain 23 0's in a location that is not a start code. Thus, every occurrence of 23 0's should be a start code and the decoder should be able to accurately detect start codes.

While the above-described operation appears straightforward, the operation can be a fairly difficult undertaking because one has to inspect all of the possible data (at the bit level) that is going to be sent, in every possible order in which it is going to be sent to ensure that a start code pattern cannot accidentally be sent. This is an arduous method of syntax design that is prone to mistakes.

This bit-level inspection design process describes, generally, the way that many video coding specifications have been designed in the past (i.e. H.261, MPEG-1, H.262/MPEG-2, most of H.263, and MPEG-4). The one exception to this is Annex E of ITU-T Recommendation H.263 which uses a technique called arithmetic coding to generate compressed bits in an algorithmic fashion from a mathematical specification. Here, there is an extra process at the end of the entropy encoder which inspects the bits that are generated and, on the encoder side, if there are too many 0's in a row, a "marker" bit (a 1-bit) is inserted before a pre-determined number of 0's are encountered. On the decoder side, the decoder counts up the zeroes and if it encounters the critical number of zeroes, it knows that it has encountered a real start code. If the decoder sees one less zero than the critical number, it knows that the following 1 bit is a marker bit inserted to avoid start code emulation, discards that bit, and takes the following bits as the continuation of the real data.

The problem with this solution is that it makes the encoder and the decoder inspect and process the incoming data at the bit level. Analyzing and shifting the location of the data that is being processed by single bit positions becomes difficult and can undesirably tax the decoder. Bit-wise shifting is also a processor-intensive operation.

Accordingly, this invention arose out of concerns associated with providing improved methods and system for preventing start code emulation.

SUMMARY

Methods and systems are described to provide approaches to start code emulation prevention by operations performed at a granularity higher than the bit level. By operating at a level other than the bit level, processing efficiencies can be enhanced. In accordance with one or more embodiments, a start code emulation prevention method looks for data patterns relative to fixed-size data portions larger than single bits. When a particular pattern is found, start code emulation prevention data is inserted to prevent start code emulation. The inserted data is larger than a single bit and, in some embodiments, comprises a byte. When a decoder decodes data that has had start code emulation prevention data inserted, it can easily identify legitimate start codes and then can remove the start code emulation prevention data to provide the original data that was intended to be conveyed.

In various embodiments, start code emulation prevention can occur that prevents the accidental emulation of start code values at locations other than data boundaries such as byte boundaries. These embodiments can be used in connection with systems that do not always preserve data alignment boundaries in the data that is processed. In some systems, the described techniques can provide a basis from which decoder systems can recover in the event that data boundaries are lost.

In addition, a data stuffing method is described which allows payload data to be rounded up in size to an integer number of bytes, and then allows filler data to be added in a manner which is easily detectable by a decoder.

BRIEF DESCRIPTION OF THE DRAWINGS

FIG. 7 is a high level diagram of a computing environment in connection with which one or more embodiments can be implemented.

DETAILED DESCRIPTION

Overview

The methods and systems described below provide approaches to start code emulation prevention at a granularity higher than the bit level. By operating at a level higher than the bit level, processing efficiencies can be enhanced. In the context of this document, operating at a level higher than the bit level is intended to refer to a process that looks for data patterns relative to fixed-size data portions larger than single bits. For example, fixed-size data portions can include bytes (i.e. 8 bits), "words" (i.e. 16 bits), "double-words" (32 bits) and the like. Thus, the inventive techniques can look for patterns within and among bytes, words, and the like.

In addition, a data stuffing method is described which allows payload data to be rounded up in size to an integer number of data unit sizes such as byte quantities, and allows filler data to be added in a manner which is easily detectable by a decoder.

In various embodiments, start code emulation prevention can occur that prevents the accidental emulation of start code values at locations other than data boundaries such as byte boundaries and the like. These embodiments can be used in connection with systems that do not always preserve data alignment boundaries in the data that is processed. In some systems, the described techniques can provide a basis from which decoder systems can recover in the event that data boundaries are lost.

In addition, while the examples provided below are discussed in the context of video data, it is to be appreciated and understood that the inventive techniques can be employed in connection with any type of data that is typically encoded and decoded and with which start code emulation prevention is desirable or necessary. Examples of such data include audio data, audio/video data, and the like.

Figure 1:
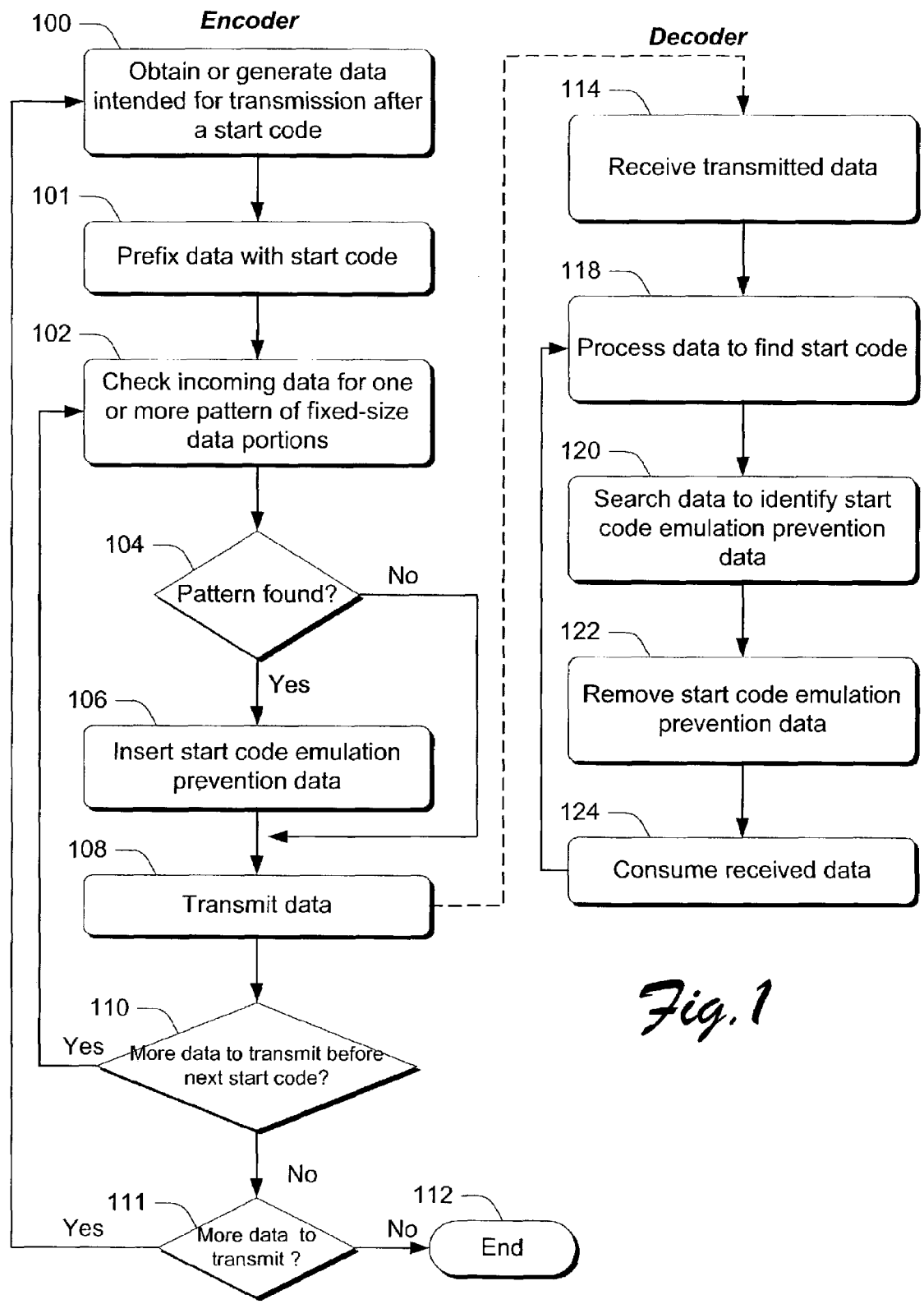
FIG. 1 is a flow diagram that describes steps in a method in accordance with one embodiment.

FIG. 1 is a flow diagram that describes steps in a method in accordance with one embodiment. The method can be implemented in any suitable hardware, software, firmware or combination thereof. In the illustrated and described embodiment, the method is implemented, at least in part in software. In addition, the reader will notice that the method is illustrated as having two different branches—one designated "Encoder" and one designated "Decoder". The "Encoder" branch illustrates steps that are carried out by or in connection with an encoder. Similarly, the "Decoder" branch illustrates steps that are carried out by or in connection with a decoder.

Step 100 obtains or generates a quantity of data that is intended for transmission after a start code. The data can comprise any suitable data. Examples of types of data include, without limitation, quantities of video data, audio data, audio/video data and the like. Step 101 prefixes the data with start codes. This step effectively adds start codes to the data that is obtained or generated in step 100. Step 102 checks or searches incoming data for one or more patterns of fixed-size data portions. In the illustrated and described embodiment, the pattern(s) that is (are) searched for comprise at least two fixed-size data portions and each individual data portion comprises at least two bits. Step 104 determines whether a pattern is found. If the pattern is not found, the method branches to step 108 where the data can be transmitted.

If, on the other hand, the pattern is found, step 106 inserts start code emulation prevention data relative to the data that contains the pattern. In the illustrated and described embodiment individual instances of the start code emulation prevention data comprise more than one bit. Preferably, the start code emulation prevention data comprises an amount of data that is equal in number of bits to an individual fixed-size data portion. Thus, where a fixed-size data portion comprises 8 bits (a quantity of data referred to as a byte), the start code emulation prevention data comprises 8 bits. After the start code emulation prevention data is inserted, step 108 transmits the data. Step 110 determines whether there is additional data that is to be transmitted before the next start code. If there is, then the method returns to step 102 and proceeds as described above. If not, the method can determine, at step 111, whether there is additional data to transmit. If there is, the method branches back to step 100. If there is not, then the method can terminate at step 112.

As an aside, consider the following. Note that one example of use of this particular technology is to separate the start code into a "start code prefix" and a "start code type" suffix, where the prefix is a single unique string of values and the suffix indicates the type of data that follows the start code. In particular, this is the structure of MPEG-2 start codes. An even more general form of use that encompasses the prefix/suffix structure as a special case, is the general notion of having one or more start code patterns. Then, one can also have one or more emulation prevention patterns. As long as the various start code patterns are distinct from the various emulation prevention patterns and all of the start code patterns are avoided in the processing of the payload data, the scheme will function properly. Additionally, one should not necessarily assume that the start code patterns are all the same length.

On the decoder side, consider the following. Once the start code emulation prevention data has been inserted by the encoder, it can be identified and removed or ignored at some point for the proper interpretation of the other data. Consider also that as the decoder receives the transmitted data, it can look for the legitimate start codes. Once it finds the legitimate start codes, it knows where the start code-defined data boundaries are located. Now, the decoder can proceed to look for and remove the start code emulation prevention data so that it can further process the real data.

Specifically, step 114 receives transmitted data that has been processed by an encoder to prevent emulation of start codes. Step 118 processes the data to find the start code. Once the start code has been found and appropriately processed (e.g. read and discarded), step 120 searches the data to identify start code emulation prevention data. Once the start code emulation prevention data is found, step 122 removes the start code emulation prevention data. Once the start code emulation prevention data has been removed, the data can be processed in a manner that is typical for the type of data that has been received. For example, the data can be consumed by a consumer device, as in step 124.

First Exemplary Method

The method about to be described illustrates but one specific example of the method shown and described in FIG. 1. In the method about to be described, a byte of emulation prevention data is inserted whenever a string of N+1 bytes of payload data matches either the entire start code prefix, or matches the first N bytes of the start code prefix plus the value of the emulation prevention byte. This method adds data less frequently than the method described in the section entitled "Second Exemplary Method", and thus reduces the transmission capability requirements to send the payload data.

The MPEG-2 start code prefix structure starts at a byte-aligned position and has 23 0's followed by a 1. This start code prefix is set forth directly below:

00000000 00000000 00000001

This structure can be generalized as a pattern that comprises some number of bytes N that have the same value, followed by some other byte that has a different value. In MPEG-2, one can say that N=2, and the first two bytes are 0 (referred to below as "W"), and that the last byte is 1 (referred to below as "X"). Thus, the start code prefix has the following pattern:

WWX

After these three bytes, in MPEG-2, another byte follows and identifies which kind of start code it is. This following byte is referred to as "Y". Essentially then, the start code consists of a start code prefix WWX, followed by a byte Y that identifies the type of start code. The entire MPEG-2 start code can be represented as:

WWXY

The start code prefix (WWX) has a fixed value, while Y has a number of different values that indicate the type of start code (e.g. slice, picture, GOP, sequence, system, and the like).

In accordance with one embodiment, the data is processed looking for the pattern WWX. When the WWX pattern is found, start code emulation prevention data is inserted to prevent start code emulation. Here, the start code emulation prevention data comprises a byte Z that has a value that is distinct from the values of the W and X bytes. Thus, assume that the encoder is inspecting bytes of data and notices the pattern WWX. Responsive to finding this pattern in the data, the encoder inserts a byte having value Z to provide the following pattern:

WWZX

At this point, the encoder has ensured that the payload data that is to be transmitted and processed by the decoder does not accidentally emulate a start code or start code prefix. Now consider the following. Just as the payload data had a chance of emulating a start code prefix by arbitrarily containing the WWX pattern, the payload data also has a chance of arbitrarily emulating data that contains the start code emulation prevention data. That is, the payload data might inherently contain the pattern WWZX. If this is the case and the encoder were not to do anything, when the decoder attempts to remove the start code emulation prevention data, it will remove the Z byte which in this case is real data.

Accordingly, in the described embodiments, the encoder is configured to prevent not only the payload data from emulating start codes or start code prefixes, but the encoder is configured to prevent the data from emulating data patterns that result from the use of start code emulation prevention data. Specifically, in this example, if the encoder identifies the pattern WWZ, it inserts a byte having the value Z between the second W and the Z to provide the following pattern (the inserted byte Z is the first Z to appear below):

WWZZ

Now, consider the processed data from the perspective of the decoder. If the decoder sees any pattern of bytes that comprises WWZ followed by either a Z or X, it knows that the first Z is an emulation prevention byte that was inserted by the encoder. Accordingly, the decoder can discard the first Z. Thus, in this example, there are two situations when an emulation prevention byte can be inserted. The first situation is when the data would accidentally emulate a start code or start code prefix. The second situation is when the data would accidentally emulate data that has had an emulation prevention byte inserted.

In either case, the decoder can simply look for the appropriate pattern, discard the emulation prevention byte, and process the data as usual.

To illustrate the above processing in a more programmatic fashion, consider the following. On the encoder side, to send a packet P[ ] of B bytes, starting with a start code prefix which consists of N or more bytes of the same value W and a last byte of a different value X, followed by an identifying start code type suffix of 1 byte having the value Y, we operate the following pseudo code process which inserts emulation prevention bytes having the value Z (where W, X, Y, and Z have different values from each other, and P[B−1] is not equal to W), where the quantity of extra data to send to fill the channel is specified by E:

```
int   B, N, E, i, j;
byte  *P, W, X, Y, Z;
for(j=0; j<N+E; j++)  /* start code prefix (SCP) */
    send_byte( W ) ;   /* jth byte of SCP */
send_byte( X ) ;        /* last byte of SCP */
send_byte( Y ) ;        /* start code type suffix */
for(i=j=0; i<B; i++)    {
    if(j >= N && (P[i] == X || P[i] == Z) ) {
        send_byte ( Z ) ;
        j = 0;
    }
    send_byte( P[i] );  /* a byte of data payload */
    if   (P[i] == W)    j++;
    else                j = 0;
}
```

In the above pseudo-code, a function "send_byte( )" is assumed to operate the transmission of a unit of data (process 108 in FIG. 1).

On the decoder side, to receive the packet, assume that the decoder has already found, read, and discarded the known start code prefix which consists of N or more bytes of the same value W and a last byte of a different value X. Assume also that we wish to read the unknown single-byte start code type suffix into a variable Y and to read the packet of payload data into an array P[ ] and determine the amount of payload data and place the quantity indication in a variable B, while removing emulation prevention bytes having the value Z (where W, X, Y, and Z have different values from each other, and P[B−1] is not equal to W):

```
int  B, N, j, next;
byte *P, W, X, Y, Z;
/* assume start code prefix was already read */
Y = receive_byte( ) ; /* start code type suffix */
for(B=j=0, next=0; more_data( ) && !next; B++) {
    P [B] = receive_byte ( ) ;
    if(j >= N) {
        if(P[B] == W)
            j ++;
        else{
            j = 0;
            next = (P[B] == X) ;
            if(P[B] == Z)
                B--;
        }
    }else
        if(P[B] == W)   j++;
        else            j = 0;
}
if (next) /* another start code found */
    B -= j+1;
```

In the above pseudo-code, a function "receive_byte( )" is assumed to operate the reception of a unit of data and a function "more_data( )" is assumed to determine whether there are any more units of data to be received (these two functions comprising process 114 in FIG. 1).

The above-described method allows an arbitrary amount of W-value stuffing prior to the start code. Formulations are equally possible that fix the number of W-value prefixes to N.

Second Exemplary Method

The method about to be described illustrates but one other specific example of the method shown and described in FIG. 1. Here, the method inserts a byte of emulation prevention data whenever a string of N bytes of data in the payload matches the first N bytes of the start code prefix, regardless of the value of the subsequent payload data. Using the nomenclature of the above example, if the data contains the pattern "WW" followed by anything, the method inserts an emulation prevention byte. Accordingly, when the encoder identifies the pattern WW, it inserts an emulation prevention byte to provide the following pattern:

WWZ

The distinction between the first-described method and the one described immediately above is that the first method looks at the first N+1 bytes to ascertain where to insert an emulation prevention byte, whereas the method described immediately above looks at the first N bytes.

The first method reduces the quantity of extra data to be transmitted, while the method described immediately above operates using simpler rules. Thus, collectively the two methods provide a choice between reducing the quantity of data transmitted and reducing rule complexity. With the first-described method, quantity of data is reduced relative to that of the second-described method. With the second-described method, simpler rules are utilized.

To illustrate the above processing in a more programmatic fashion, consider the following. On the encoder side, to send a packet P[ ] of B bytes, starting with a start code prefix which consists of exactly N bytes of the same value W and a last byte of a different value X, followed by an identifying start code type suffix of 1 byte having the value Y, we operate the following pseudo code process which inserts emulation prevention bytes having the value Z (where W, X, Y, and Z have different values from each other, and P[B−1] is not equal to W):

```
int   B, N, i, j;
byte  *P, W, X, Y, Z;
for(j=0; j<N; j++)       /* start code prefix */
    send_byte( W ) ;     /* first byte of start code */
send_byte( X ) ;         /* last byte of start code */
send_byte( Y );          /* start code type suffix */
for(i=j=0; i<B; i++)     {
    send_byte( P[i] ) ;  /* a byte of data payload */
    if( P[i] != W )
        j=0 ;
    else
        if(++j == N) {
            send_byte ( Z ) ;
            j = 0;
        }
}
```

In the above pseudo-code, a function "send_byte( )" is assumed to operate of the transmission of a unit of data (process 108 in FIG. 1).

On the decoder side, to receive the packet, assume that the decoder has already found, read, and discarded the known start code prefix which consists of exactly N bytes of the same value W and a last byte of a different value X, and that we wish to read the unknown single-byte start code type suffix into a variable Y and to read the packet of payload data into an array P[ ] and determine the amount of payload data and place the quantity indication in a variable B, while removing emulation prevention bytes having the value Z (where W, X, Y, and Z have different values from each other, and P[B−1] is not equal to W):

```
int   B, N, j, k;
byte  *P, W, X, Y, Z;
/* assume start code prefix was already read */
Y = receive_byte ( ) ;  /* start code type suffix */
for(B=j=0, k=Z; more_data( ) && k != X; B++) {
    P [B] = receive_byte ( ) ;
    if(P[B] == W) {
        if(++j == N) {
            k = receive_byte( ) ; /* more_data( ) always */
            if(k != Z && k != X)
                declare_error( ) ;
            j = 0;
        }
    }else
        j = 0;
}
if(k == X) /* another start code found */
    B -= N;
```

In the above pseudo-code, a function "receive_byte( )" is assumed to operate the reception of a unit of data and a function "more_data( )" is assumed to determine whether there are any more units of data to be received (these two functions comprising process 114 in FIG. 1).

It is believed that the above-described methods will expand the quantity of a large amount of ideal random input payload data by a factor of approximately $1/256^N$ for the second-described method and $1/256^{(N+1)}$ for the first-described method. These amounts are small if N is large (e.g., 2 or greater, noting that N=2 for MPEG-2 start codes). The worst-case expansion factor for the payload is believed to be $1/N$ for the second-described method and $1/(N+1)$ for the first-described method. If N is increased, the payload expansion factor is reduced in both statistical and worst-case analysis—although the quantity of data used by the start codes themselves is increased.

It should be appreciated that the above-described emulation prevention process does not depend on knowing how much data is in the packet before starting to send it. Thus it adds no significant delay.

This formulation of the second-described method assumes that the inserted emulation prevention bytes are single bytes having the value Z. It is possible instead to use any value or multiple values or one or more strings of values for the emulation prevention data, as long as the first byte of inserted data is not equal to W or X, which would emulate a valid start code or appear to be a continuation of the start of the prefix.

One can even carry information in these emulation prevention bytes (such as an H.263-style GOB frame ID/picture sequence number, for example, or perhaps to set just the MSB to '1' and use the other seven bits to send an ASCII character).

If one considers what happens at the end of the packet on the decoder side, we realize that it is easier to control the operation if the last byte of the data packet payload is not W. This means that the last byte sent before a start code will never need to be an emulation prevention byte and that a detectable boundary can be located by the decoder between the end of the payload data and the start of the sequence of bytes equal to W for the next start code. Forcing this to be the case can also allow one to stuff in any amount of W bytes (e.g., zero bytes) after the end of the payload and before the next start code without losing track of where the end of the payload is.

Data Stuffing

Normally, with video data, the data that is sent as the data payload may not be an integer number of bytes. For example, one may have 627 bits that are to be sent between two start codes. The system multiplex level may, however, operate in bytes. This is so for the MPEG-2 specification. Other reasons such as enabling the detection of some false start code patterns generated by transmission errors or enabling simple decoding processes for the data contents of the beginning of the payload may also justify a desire for a packet to contain an integer number of data units such as bytes. Thus, one may have to send a little more data in order to carry the 627 bits of data. The question then becomes how to pad out the data to make it an integer number of bytes.

There are other situations when it would be useful to simply send extra filler data. For example, if a channel has a capacity of 1 Megabit/sec and the quantity of payload data to be sent is only 900 kbits/sec, one may need or want to fill up the channel with filler data.

In accordance with one embodiment, a data stuffing technique enables extra data to be added to the channel to, in essence, pad the payload data.

Figure 2:
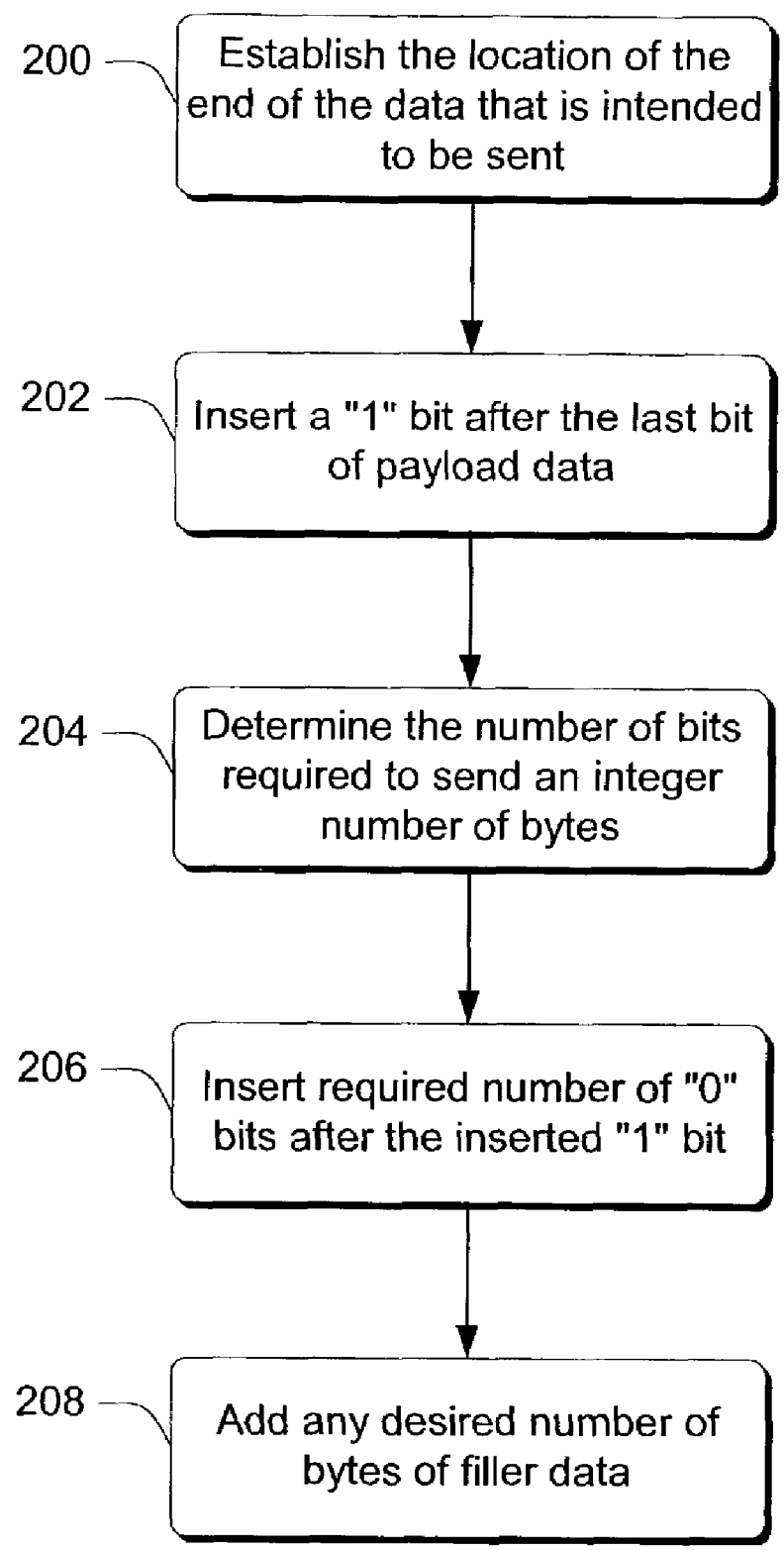
FIG. 2 is a flow diagram that describes steps in a method in accordance with one embodiment.

FIG. 2 is a flow diagram that describes steps in a data stuffing method in accordance with one embodiment in which the start codes are assumed to begin with a string of bits equal to zero. Step 200 establishes the location of the end of the data that is intended to be sent. Step 202 inserts a "1" bit after the last bit of payload data. Step 204 determines the number of additional bits required to send an integer number of bytes. Step 206 inserts the required number of "0" bits after the inserted "1" bit. Step 208 adds any desired number of bytes of filler data. The filler data may consist of any data patterns designed to avoid confusion over the locations of the true payload data and of the intentional start codes. This is typically implemented by inserting bytes of value "0".

As an example, consider the following. Assume that 627 bits are to be sent. Here, step 202 would insert a "1" bit after the 627$^{th}$ bit. Step 204 would then determine that four more bits are required to provide an integer number of bytes— here, 79 bytes. Accordingly, step 206 would insert four "0" bits or 0000 after the inserted "1" bit. Now, having established an integer number of bytes, step 208 can, if so desired, add any desired number of bytes of filler data. In this particular example, bytes having a value of 0 can be inserted. The filler data can be used simply as filler data, or for some other purpose such as containing information that a decoder can use for some purpose.

Now, consider the situation at the decoder. The decoder receives the stuffed data and can start at the end of the data and look backwards through the data. All of the bytes that the decoder initially sees will be the 0 bytes until it gets to the byte with the "1" bit. The "1" bit tells the decoder the location of the end of the payload or real data. Thus, once the decoder finds the "1" bit that was inserted, it can determine exactly where the real data ends.

Thus, the techniques described above can be used to "round up" the number of bits that are sent so that the number of bits that are sent comprise an integer number of data units. Additionally, these techniques can be used to stuff filler data in between start codes that designate the start of payload data.

Start Code Emulation Prevention for Non-boundary Aligned Positions

The above-described embodiments work well in systems that are designed to preserve the data's boundary alignment or byte alignment. There are some systems, however, that do not always keep track of the data boundary alignment.

For example, in one such system, referred to as ITU-T H.320, it is possible to lose track of where each byte of data in the system starts relative to the start of the data stream, as the data is transmitted as a sequence of bits rather than bytes and occasional data losses of unknown quantities can occur. If the system loses track of the byte alignment, and if emulation prevention only prevents emulation that starts on the boundary of a byte, then the system's ability to recover from a byte alignment loss can be impeded. For example, if the system only prevents start code emulation at byte boundaries, then it is possible for a start code emulation to take place at a location other than at the byte boundary. That is, the system that was encoding for start code emulation prevention at the byte boundaries may not have cared about bit-shifted start code emulation that occurred at locations other than the byte boundary. For systems that maintain or preserve the byte boundary locations this should not be a problem. This is because, as these systems know where the byte boundaries are, they can simply locate the byte boundary and look for the real start codes. Once the real start codes are found, the system can recover as described above. In systems where the byte boundary has been lost, for whatever reason, this can be a problem because the system may attempt to recover using an emulated start code that occurs at a bit-shifted location. Specifically, if the byte boundary is lost, then the system may attempt to look for any data that fits the start code pattern starting at some arbitrary alignment position relative to the original byte boundaries. If such data is not a real start code, but rather an emulated start code at a bit-shifted location, recovering from this location can severely impede the system's ability to legitimately recover.

The embodiments described just below are directed to providing methods and systems that prevent start code emulation at locations that do not necessarily start at a data boundary, such as a byte boundary. Accordingly, these methods and systems can be advantageously employed in connection with systems that do not always preserve data alignment at the data boundary locations. In addition, in those systems that for some reason lose track of the data boundaries, the inventive methods and systems can provide a way for the system to legitimately recover using only legitimate start codes.

Early Interruption

The first approach that is discussed is referred to as an "early interruption" approach. Here, the early interruption approach is directed to interrupting a potential start code emulation before there is any chance that a shifted version of the start code can occur. This is done by analyzing the pattern of bits in the start code design in detail for each shifted position of that start code relative to the start of a data byte. Then, instead of inserting a special emulation prevention byte only when a byte aligned start code can occur, the approach inserts an emulation prevention byte in a manner to prevent non-aligned emulation of the start code pattern at positions that are shifted relative to the data boundaries-which in this case are byte boundaries.

Detection of a true start code can provide the ability to detect the true alignment of the data relative to the data boundaries or byte boundaries. This is because the start codes are typically designed to always start at a data or byte boundary. After detection of the location of a true start code in the data, the receiver can use this awareness of the starting location of each byte to aid in the decoding process of separating the payload data from the start codes and from the start code emulation prevention data. This is because the decoder can be designed to be aware of the method used to prevent emulation of start code patterns in the transmitted data.

Figure 3:
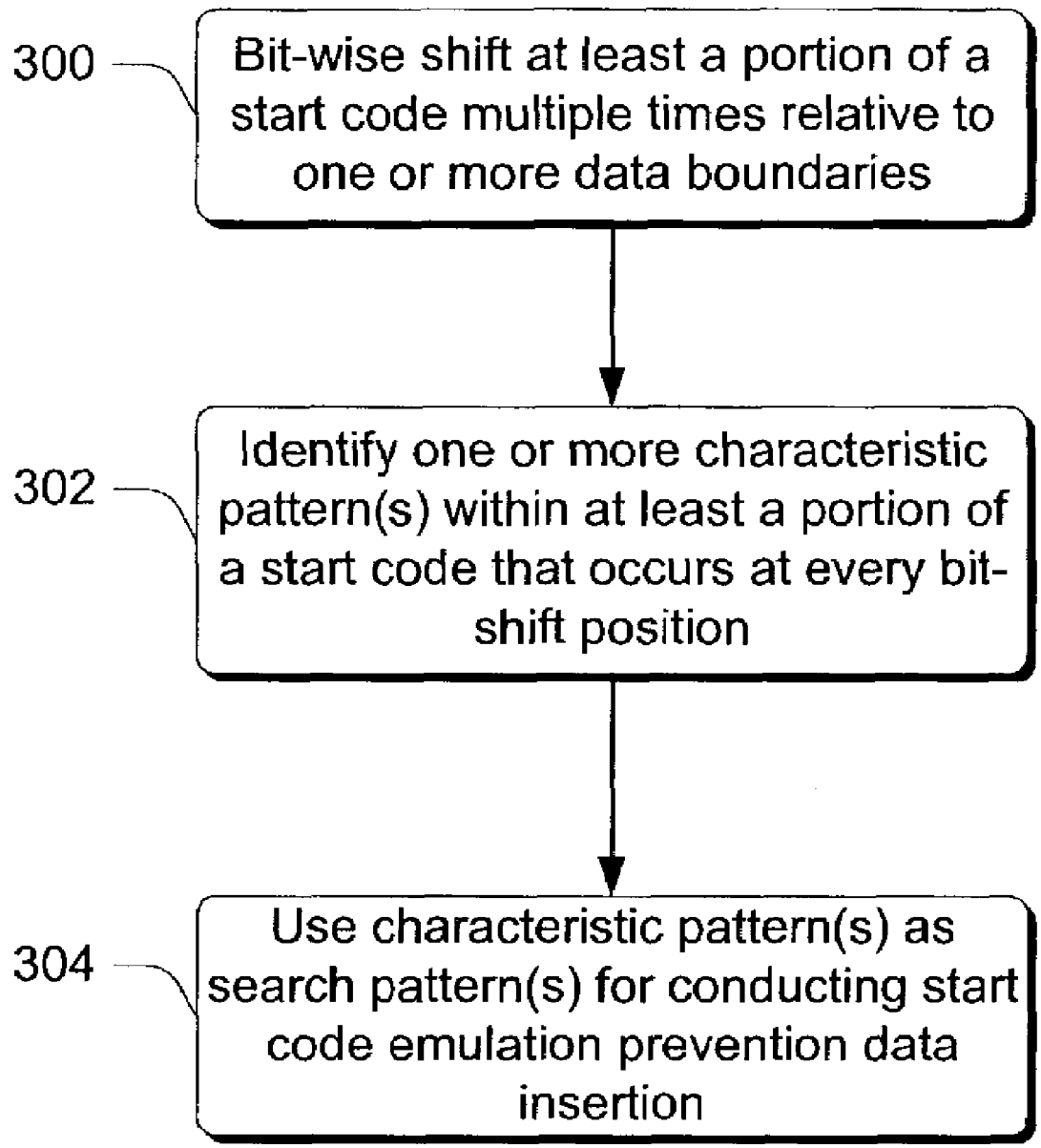
FIG. 3 is a flow diagram that describes steps in a method in accordance with one embodiment.

FIG. 3 is a flow diagram that describes a method in accordance with one embodiment. The illustrated method provides an example of how start code emulation prevention can be conducted to assure that start codes are not emulated at bit-shifted positions Step 300 bit-wise shifts at least a portion of a start code multiple times relative to one or more data boundaries. In one embodiment, the portion of the start code that is bit-wise shifted comprises the start code prefix. Step 302 identifies one or more characteristic pattern within the start code portion that occurs at every bit-shifted position relative to at least one data boundary. Step 304 uses the characteristic pattern(s) that were identified in step 302 as a search pattern for conducting start code emulation prevention data insertion.

Figure 4:
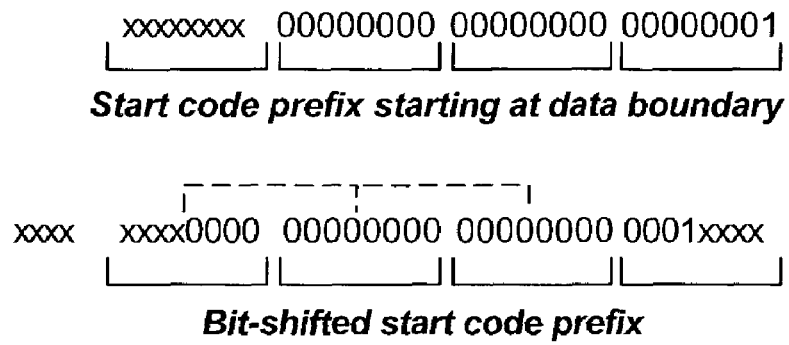
FIG. 4 is a diagram that illustrates one aspect of a processing method in accordance with one embodiment.

As but one example of how this can be done, consider the following in connection with FIG. 4.

Consider the start code prefix that is constructed as N bytes having the value 0x00 (using the C-language convention that "0x" indicates a hexadecimal numerical value, so that 0x00 denotes a hexadecimal byte value equal to zero) followed by one byte having the value 0x01, where N=2. For example, in FIG. 4, an exemplary start code prefix appears and coincides its start with data boundaries that are illustrated by the solid brackets. Thus, the first byte of the start code prefix consists of the first eight zeros, the second byte consists of the next eight zeroes and so on. Preceding the first eight zeros is a byte of "x" values denoting arbitrary unknown values of preceding data. Now, when this start code prefix or portion is bit-wise shifted relative to the indicated data boundaries (one of the bit-wise shifts being indicated just below the top illustration in FIG. 4), a characteristic pattern emerges which is illustrated by the dashed brackets. By examining the pattern of bits created by each shifted position of the start code prefix relative to the start of a byte, we can determine that, in this case, in any sequence of data that contains a shifted copy of this start code, at least N bytes having the value 0x00 will always be present. Thus, a characteristic pattern for an emulated bit-shifted start code prefix is the presence of N bytes having the value 0x00. This characteristic pattern can now be used as a search pattern for conducting start code emulation prevention data insertion, as prevention of this pattern at any single alignment position will prevent the occurrence of start codes at all alignment positions.

More specifically, consider the method described above under the heading "First Exemplary Method". There, an emulation prevention byte Z is inserted if the data contained the pattern of N bytes of value 0x00 followed by the value 0x01 or Z. Accordingly, the new pattern would contain N bytes of value 0x00 followed by a byte having the value Z followed by a byte having either the value 0x01 or Z (an expansion of the input data length by one byte whenever either of two patterns of length N+1 is encountered).

Figure 5:
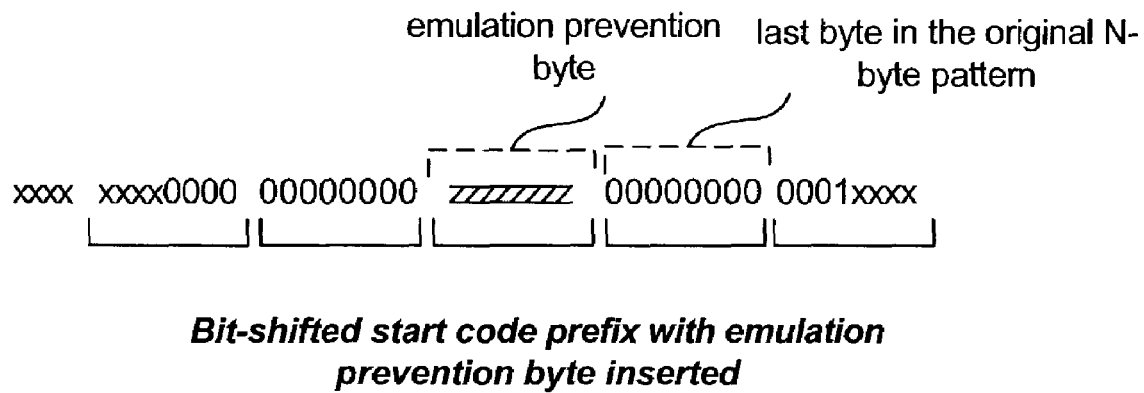
FIG. 5 is a diagram that illustrates one aspect of a processing method in accordance with one embodiment.

In accordance with the early interruption method presently being described, the desire is to prevent all shifted versions of the start code prefix or portion, not just the start code prefix in a byte-aligned position. So, in accordance with this method and in connection with this specific example, an emulation prevention byte having some value Z is inserted before the last byte of any sequence of N bytes having the value 0x00, thus preventing any sequence of N bytes of value 0x00, and thus, preventing all shifted copies of start codes relative to any byte-alignment positioning. In this example, the pattern is checked and the emulation prevention bytes are inserted only at byte-aligned positions. As an example, consider FIG. 5 which shows a sequence for N=2 with an emulation prevention byte (denoted by eight bits with values shown as "z") inserted before the last byte in the sequence containing a bit-shifted start code prefix. Although not shown explicitly in FIG. 5, it is assumed for purposes of illustration in FIG. 5 that at least one of the last four bits symbolized as "x" values is not equal to zero (otherwise, the emulation prevention process would have inserted another emulation prevention byte at a location just after the byte containing the last four bits symbolized as "x" values).

Thus, this method recognizes all of the bit-shifted positions of the start code prefix and interrupts the sequence in a manner to prevent any bit-shifted start code prefix emulations. This is accomplished without requiring bit-wise processing in the encoder, as the encoder is searching for the characteristic pattern only at positions that are aligned to byte boundaries and is inserting emulation prevention data only in units of whole bytes.

Additionally, the encoder can also insert an emulation prevention byte to avoid a situation where the payload data emulates data that has had emulation prevention data already inserted. For example, if the encoder sees N−1 bytes having a value of 0x00, followed by a byte that has a value of the emulation prevention byte (i.e. Z), then the encoder inserts an emulation prevention byte.

Alternatively, the encoder could only insert a byte for this purpose if the data payload contains a sequence of N−1 data bytes equal to 0x00 followed by a byte equal to Z and also followed by a byte equal to 0x00. This would reduce the quantity of inserted emulation prevention data, although it would require variable-length sequence processing in the encoder and decoder.

Thus, an early interruption method can be summarized, for this particular example, in the table below for the specific start code prefix values discussed above:

| First Early Interruption Method | |
|---|---|
| Pattern to Replace | Replacement Pattern |
| N bytes = 0x00 | N-1 bytes = 0x00, byte = Z, byte = 0x00 |
| N-1 bytes = 0x00, byte = Z | N-1 bytes = 0x00, byte = Z, byte = Z |

Now, consider the situation from the decoder's point of view. In the decoder, whenever the decoder sees N bytes that have a value of 0x00, the decoder knows that this has to be a true start code prefix because the encoder has prevented this situation from occurring at any place, including bit-shifted locations, that is not a start code. The decoder can perform this start code detection without using bit-wise processing, as the characteristic pattern for detection of the true start code can be found when starting at any alignment position relative to byte boundaries. Once the decoder knows where the true start code is, it knows the byte alignment. This is because the true start code starts at a byte aligned position. Thus, in this specific example, the decoder knows that the next byte that is not 0x00 contains the end of the start code prefix. The decoder can then look for the pattern of bits that ends the start code prefix (in this case a "1" bit), and after that it can find the true payload data.

Consider additionally that once the decoder knows the byte alignment by virtue of locating the start code prefix, it can easily locate the emulation prevention data that was inserted. It does this by virtue of the fact that the emulation prevention data was inserted at byte-aligned positions. Because the decoder knows the byte alignment, it can look for the emulation prevention data patterns at the byte boundaries. That is, it can look for the replacement patterns at the byte boundaries described in the table above. It can then remove the emulation prevention data and proceed in its decoding process.

The method described above is advantageous because even though the encoder that performs the emulation prevention processing prevents emulation at all bit-shifted positions, it does so by examining the data sequence at the byte level and manipulating that data at only the byte level, thus saving the complexity of performing bit-wise operations in this process. The same is true for the decoder, which can detect the presence of true start codes and by operations performed on bytes, and it can then recover byte alignment and then perform the removal of the emulation prevention data by operations performed on bytes.

Comparing and contrasting this first early interruption method with the method described in the section entitled "First Exemplary Method", consider the following. One disadvantage of the early interruption method is that because it looks for a shorter pattern (e.g. N bytes rather than N+1 bytes), it will insert data more often. There is, however, something that can be done about this. Specifically, the value of N can be increased. That is, instead of using a 3-byte start code prefix, one could use a 4-byte start code prefix. This, however, increases the quantity of another kind of data that needs to be inserted in the system. That is, whenever the encoder inserts a start code, it will be inserting a longer start code so that it costs more in terms of increasing the quantity of added data. One advantage of this early interruption method, however, is that it allows the decoder to recover byte alignment.

A second embodiment of an early interruption method would be to perform a search for a pattern match and a replacement of pattern for an alternative pattern that is common to multiple patterns that are replaced in the first illustrated design. An example of this alternative embodiment is shown in the table below.

| Second Early Interruption Method | |
|---|---|
| Pattern to Replace | Replacement Pattern |
| N-1 bytes = 0x00 | N-1 bytes = 0x00, byte = Z |

In this second early interruption method, a single search pattern (N−1 bytes equal to 0x00) is sufficient to prevent start code emulation for all shifted positions, because this pattern is common to the two patterns shown in the two rows of the table illustrating the first early interruption method.

Considering this second situation from the decoder's point of view, the detection of a true start code prefix is unchanged—this consists of recognition of the presence of N bytes that have a value of 0x00 as in the first early interruption method. Moreover, as in the first early interruption method, once the decoder knows where the true start code is, it knows the byte alignment because the true start code starts at a byte aligned position, and it can then easily locate the emulation prevention data that was inserted by looking for the replacement pattern and can then remove the emulation prevention data and proceed in its decoding process.

This second early interruption method reduces the number of patterns necessary for recognition by the pattern searching process when compared to the first early interruption method. As a result, the complexity of that search process reduced, although the quantity of the emulation prevention data that is inserted is increased due to the use of a match to a shorter pattern.

As with the first early interruption method, the quantity of added emulation prevention data can be reduced by increasing the value of N, but this adds to the quantity of actual start code data.

An important observation is that the second early interruption is similar in construction to the method described in the section entitled "Second Exemplary Method", in that it uses a pattern match to a single short pattern rather than to multiple longer patterns (in contrast to the "First Exemplary Method" and the first early interruption method, which each use multiple patterns). In particular, examination of the methods shows that the encoding pattern search and replacement process for the second early interruption method for preventing emulation of a start code prefix of length N+1 at arbitrarily-shifted positions of alignment relative to byte boundaries is precisely the same as the encoding pattern search and replacement process for the "Second Exemplary Method" for preventing emulation of a start code prefix of length N at positions that are aligned to byte boundaries. This property will be used in the following section.

Emulation Prevention Using Multiple Length Start Codes

The early interruption methods described above provide a solution for the problem of enabling recovery when byte alignment is lost in connection with preventing start code emulation at any bit-shifted position whose starting location does not coincide with a data boundary. They do so, however, at the cost of adding emulation prevention data more frequently than would be necessary for preventing only the emulation of start codes that occur at aligned positions. In the embodiments described just below, an approach is provided which enables alignment recovery in a manner similar to the early interruption methods, and which also reduces the total quantity of inserted emulation prevention data and start code data. Before discussing the specific solutions, consider the following insight.

There are many different types of data with which start codes are sent. For example, with video data, it is common to send a start code for each GOP, each picture, and within each individually-decodable region of each picture (i.e. a slice start code). In addition, there are different types of pictures such as I-, P-, and B-pictures. Thus, there can be different types of start codes within any one particular system. Some of these start codes may occur much more frequently than others. For example, start codes on slices occur much more frequently than start codes on GOPs or sequences.

Given this, when a system is designed, it can be desirable to make start codes that occur more frequently be shorter than start codes that occur less frequently. In accordance with the embodiments described below, a distinction is made between two or more different lengths of start code prefixes. For start code prefixes having longer lengths, bit-shifted emulation within the payload content is prevented. This is done by employing an early interruption method for start code prefixes having longer lengths. For start code prefixes having shorter lengths, only byte-aligned emulation of such start codes is prevented. In such a system, it can further enhance efficiencies if the longer start codes are sent significantly less frequently than the shorter ones so that the average start code length is close to that of the shorter start code.

With this solution, when the data is used in an environment that does not preserve byte alignment, byte alignment can be recovered by searching within the data for the longer start code. Once the longer start code is located and byte alignment is recovered, the location of the shorter start codes that follow it can also be found by a byte-oriented search only.

As but one example of how this can be implemented, consider the following. In this example, the length of the longer start code prefix is denoted as $N_L+1$, and the length of the shorter start code prefix is denoted as $N_S+1$.

With the particular structure of start code prefixes used in this example, even in systems that do not preserve byte alignment, the longer bit-shifted start codes can be detected within the data stream using a byte-oriented search for $N_L$ bytes having the value 0x00. These particular start code values enable easy byte-oriented detection.

Specifically, a preferred example method is to set $N_L=N_S+1$. Then one emulation prevention process can be summarized as set forth in the table below:

| First Emulation Prevention Process Using Multiple Length Start Codes | |
|---|---|
| Pattern to Replace | Replacement Pattern |
| $N_S$ bytes = 0x00, byte = 0x01 | $N_S$ bytes = 0x00, byte = Z, byte = 0x01 |
| $N_S$ bytes = 0x00, byte = 0x00 | $N_S$ bytes = 0x00, byte = Z, byte = 0x00 |
| $N_S$ bytes = 0x00, byte = Z | $N_S$ bytes = 0x00, 2 bytes = Z |

In the above table, the first row describes a first pattern to replace and a replacement pattern that prevents emulation of the shorter start code at byte-aligned positions. The second row describes a second pattern and a replacement pattern that prevents emulation of the longer start code at both byte-aligned and non-byte-aligned positions. The third row describes a third pattern and a replacement pattern that provides a way to distinguish between bytes of value Z inserted by the emulation prevention process and other bytes of value Z that naturally happen to follow Ns bytes of value 0x00 in the data payload. Note that this still allows the encoder to insert any number of zero-valued bytes just prior to any start code without harming the ability for the decoder to identify the location of the end of the data payload or the location of the next start code. In fact, any such zero-insertion will add in quicker recovery of byte alignment if the encoder chooses to insert some number of zero-valued bytes prior to some shorter start codes.

Alternatively, the third row in the above process could be modified such that the extra byte of value Z is inserted only in the case of Ns bytes of input data of value 0x00 followed by one byte of value Z and also followed by an input data byte of value 0x00. This would reduce the quantity of inserted emulation prevention data, although it would require variable-length sequence processing in the encoder and decoder.

This first method reduces the quantity of data needed for emulation prevention from the amount that would be needed to prevent non-aligned emulation of the shorter start code values to an amount that is reduced by approximately a factor of 171 (reducing the emulation prevention process data expansion factor from approximately $$\frac{2}{256^{N_S}}$$

to approximately $$\frac{3}{256^{N_S+1}}).$$

Figure 6:
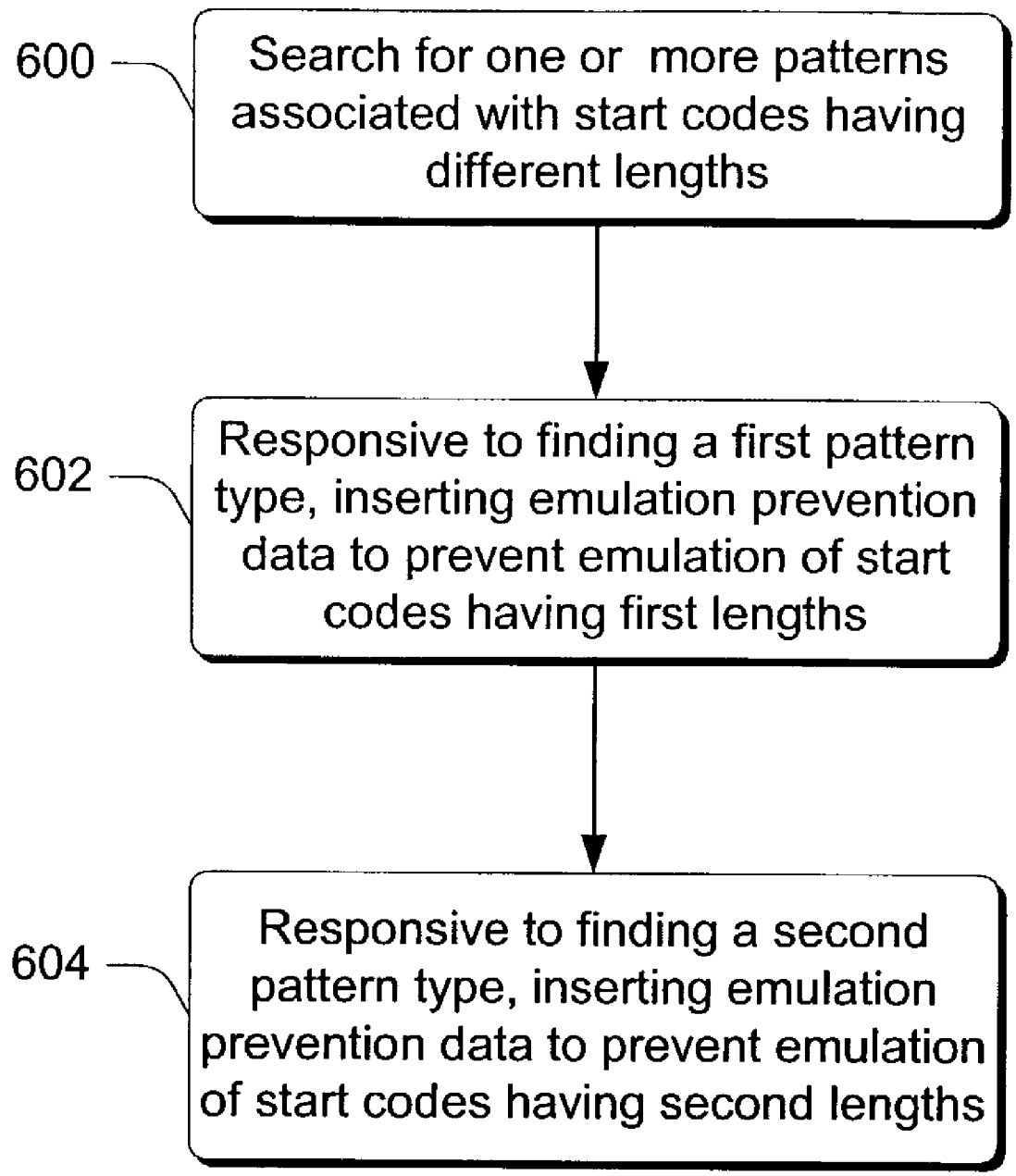
FIG. 6 is a flow diagram that describes steps in a method in accordance with one embodiment.

FIG. 6 is a flow diagram that describes steps in a method in accordance with an embodiment that utilizes emulation prevention data in connection with data that can contain start codes or start code prefixes having different lengths. The method can be implemented in any suitable hardware, software, firmware or combination thereof. In the illustrated and described embodiment, the method is implemented by a suitably configured encoder.

Step 600 searches for patterns associated with start codes having different lengths. Any suitable number of different lengths can be utilized. In the above example, start codes having two separate lengths are utilized. Responsive to finding a first pattern type, step 602 inserts emulation prevention data to prevent emulation of start codes having first lengths. Here, the first pattern type can be one that is associated with the shorter start code and can be exemplified by the pattern appearing in the "Pattern to Replace" column of the first row of the table above. Additionally, the corresponding emulation prevention data for this specific pattern and for this specific example can be exemplified by the pattern appearing in the "Replacement Pattern" column of the first row of the above table.

Responsive to finding a second pattern type, step 604 inserts emulation prevention data to prevent emulation of start codes having second lengths. Here, the second pattern type can be one that is associated with the longer start code and can be exemplified by the pattern appearing in the "Pattern to Replace" column of the second row of the table above. Additionally, the corresponding emulation prevention data for this specific pattern and for this specific example can be exemplified by the pattern appearing in the "Replacement Pattern" column of the second row of the above table.

This method can also advantageously provide a way to distinguish between bytes of value Z inserted by the emulation prevention process and other bytes of value Z that naturally happen to follow Ns bytes of value 0x00 in the data payload, although the flow diagram does not specifically illustrate this.

Consider now what can occur on the decoder side. On the decoder side, if byte alignment is lost, recovery can take place by the decoder looking for a long start code prefix. Note that because of the emulation prevention processing that takes place at the encoder, emulation of the long start code prefixes is prevented at all bit-shifted positions. Thus, once the decoder finds a pattern that corresponds to a true long start code prefix, it has located the true start code. By locating the true long start code, byte alignment is understood to be recovered. That is, because the true long start codes occur at byte aligned locations, finding a long start code re-establishes byte alignment. Once the decoder recovers the byte alignment, it can look for the shorter start codes only at the proper byte aligned positions. In connection with the process, the decoder can go about removing the emulation prevention data in the manner described above.

The above described processing is advantageous in that a mechanism is provided for byte alignment recovery in the event that byte alignment is lost. Additionally, by virtue of the fact that different lengths of start codes or start code prefixes are used, the described method avoids burdening the data stream with extra information because the most frequently used start code prefixes are made to be shorter than the less frequently used start code prefixes.

As was the case in the second early interruption method described above, it may be possible to reduce the number of patterns that need to be searched for by the encoder and decoder by shortening the length of the patterns. In this case, patterns to be tested for prevention of emulation of start codes having different lengths may become the same, allowing the merging of some steps of the process. For example, if the pattern(s) used for detection of the first pattern type in step 602 and the pattern(s) used for detection of the second pattern type in step 604 are the same patterns, steps 602 and 604 can be combined. A second emulation prevention process using multiple length start codes that illustrates this ability to combine steps is shown in the table below. This process corresponds to the second early interruption method for prevention of emulation of non-aligned start codes of length $N_L+1$ (which is length $N_S+2$) and also corresponds to the second exemplary method for prevention of emulation of byte-aligned start codes of length $N_S+1$. Thus, the search and replacement of a single pattern can suffice to prevent both types of start code emulation.

| Second Emulation Prevention Process Using Multiple Length Start Codes | |
|---|---|
| Pattern to Replace | Replacement Pattern |
| $N_S$ bytes = 0x00 | $N_S$ bytes = 0x00, byte = Z |

This second emulation prevention process using multiple length start codes simplifies the pattern search and replacement process, as it reduces the number of patterns that need to be detected and replaced. However, the quantity of the emulation prevention data that is inserted is increased due to the use of a match to a shorter pattern. The quantity of emulation prevention data that is inserted is increased by approximately a factor of $$\frac{16}{3} = 5.33$$

relative to the first emulation prevention process using multiple length start codes that is described above (increasing the emulation prevention process data expansion factor from approximately $$\frac{3}{256^{N_S+1}}$$

to approximately $$\frac{1}{256^{N_S}}\Big).$$

Enhancements

There are some enhancements that pertain to how easy it is to detect particular patterns and which can be employed to enhance processing efficiencies. For purposes of the examples given below, start code prefixes are assumed to comprise a certain number of bytes having value W=0x00, followed by a byte having value X=0x01. It is to be appreciated, however, that the principles described below can be employed in connection with other start code prefixes having values that are different from those given in the examples.

The first enhancement is as follows. Using the notation (i.e. W, X, and Z) provided above, Z and X, or Z and W can be chosen to differ by the value of only a single bit. This can enable easy detection of either of two values in the stream of data at the encoder and decoder. To illustrate the usefulness of having Z and X differ by only one bit value, consider the processing done by the receiver of the data. When a decoder is searching the data stream to detect start codes and remove emulation prevention data, after detecting N or more bytes of value W=0x00, it may perform a test of whether the next byte of input data is equal to Z or X. If Z and X differ by the value of more than one bit, then, using pseudo-C programming constructs to illustrate the processing requirements, the test might be performed as:

```
if(in_byte != Z && in_byte != X) {
    etc.
}else{
    etc.
}
```

However if Z and X differ by only one bit value, then, using pseudo-C programming constructs and assuming X is 0x01 and Z is 0x81, the test could be performed as:

```
if( (in_byte & 0x7F) == 0x01) {
    etc.
}else{
    etc.
}
```

The second enhancement recognizes that in some of the emulation prevention processes described above, one is distinguishing between three patterns. If one wants these patterns to differ from each other by a minimal number of bits, it takes two bits to distinguish between the three patterns. However, two bits are enough to identify four objects or patterns. Here, there are only three patterns that are necessary to distinguish between and, as such, it may be advantageous for there to be a fourth pattern that the system is not using for ordinary data. Now, if the encoder is configured to set the emulation prevention byte equal to a value of 2 or 3, this means that the system can distinguish between the three above patterns by simply looking at the two least significant bits in each pattern. For example, if W is equal to 0x00, X is equal to 0x01, and Z is equal to 0x02, then if the two least significant bits are 0, then it is a repetition of the initial byte value W; if the two least significant bits are 1, then it is the final byte value X; if the two least significant bits are a 2, then it is the emulation prevention value Z. The other value, i.e. the value 3, can be treated as a special value other than ordinary data. Thus, at the encoder, instead of looking for three patterns, it can look for four patterns and find them very easily because they are all the same except for the 2 least significant bits. This can speed up and simplify processing at the encoder and the decoder.

Thus, instead of replacing three sequences of values with the emulation prevention process, the system can replace four sequences of values. These four sequences can be distinguished from each other by only the value of two bits. In other words, the encoder or decoder detection process for detecting whether input data has one of these special values (assuming for the moment that W=0x00, X=0x01, and Z=0x81) can be simply:

```
if( (in_byte & 0x7E) {
    etc.
}else{
    etc.
}
```

The fourth special byte value (in this case 0x80) can be used for various purposes such as another type of start code or can be left unused by the system.

As a third enhancement, consider the following. Padding of the space after the end of the data payload with bytes having the value W can be allowed without the need to insert emulation prevention bytes between the padding values, as the next value to arrive after the sequence of W's is X, which indicates a true start code prefix. This can allow any integer number of bytes of "stuffing" to fill the transmission channel for some purpose, such as alignment to special boundaries (such as 32 bit DWORD boundaries or fixed-length packet boundaries) or simply to fill up a constant bit-rate channel when no information is desired to be transmitted.

Another benefit of the padding is that if the values of the start codes are chosen to allow it, the encoder can be allowed to pad in order to provide resynchronization to byte boundaries in the case of byte alignment loss. Thus, the encoder can have the discretion for how often to send one or more extra padding bytes to allow recovery of byte alignment by a decoder. Some encoders could enable byte alignment recovery very often by adding extra padding prior to every start code, and others could choose to do so less frequently.

Some particularly interesting values of Z are Z=0x80, 0x02, 0x81 and 0x03, in the case that W=0x00 and X=0x01.

A format specification could specify minimum frequencies for extra padding bytes to be added for byte alignment recovery, or could associate extra padding with particular types of start codes in the data stream (such as padding the start of each picture in a compressed video data stream but not requiring padding before lower-level start codes such as those known as slice or GOB start codes in MPEG-2 or H.263 video).

Exemplary Computing Environment

FIG. 7 illustrates an example of a suitable computing environment 700 on which the system and related methods described below can be implemented.

It is to be appreciated that computing environment 700 is only one example of a suitable computing environment and is not intended to suggest any limitation as to the scope of use or functionality of the encoding/decoding system described above. Neither should the computing environment 700 be interpreted as having any dependency or requirement relating to any one or combination of components illustrated in the exemplary computing environment 700.

The various described embodiments can be operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The embodiments can also be practiced in distributed computing environments where tasks are performed by remote processing devices that are linked through a communications network. In a distributed computing environment, program modules may be located in both local and remote computer storage media including memory storage devices. Components of the described computing system can be used to implement an encoder and a decoder that functions as described above.

In accordance with the illustrated example embodiment of FIG. 7, computing system 700 is shown comprising one or more processors or processing units 702, a system memory 704, and a bus 706 that couples various system components including the system memory 704 to the processor 702.

Bus 706 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 700 typically includes a variety of computer readable media. Such media may be any available media that is locally and/or remotely accessible by computer 700, and it includes both volatile and non-volatile media, removable and non-removable media.

In FIG. 7, the system memory 704 includes computer readable media in the form of volatile, such as random access memory (RAM) 710, and/or non-volatile memory, such as read only memory (ROM) 708. A basic input/output system (BIOS) 712, containing the basic routines that help to transfer information between elements within computer 700, such as during start-up, is stored in ROM 708. RAM 710 typically contains data and/or program modules that are immediately accessible to and/or presently be operated on by processing unit(s) 702.

Computer 700 may further include other removable/non-removable, volatile/non-volatile computer storage media. By way of example only, FIG. 7 illustrates a hard disk drive 728 for reading from and writing to a non-removable, non-volatile magnetic media (not shown and typically called a "hard drive"), a magnetic disk drive 730 for reading from and writing to a removable, non-volatile magnetic disk 732 (e.g., a "floppy disk"), and an optical disk drive 734 for reading from or writing to a removable, non-volatile optical disk 736 such as a CD-ROM, DVD-ROM or other optical media. The hard disk drive 728, magnetic disk drive 730, and optical disk drive 734 are each connected to bus 706 by one or more interfaces 726.

The drives and their associated computer-readable media provide nonvolatile storage of computer readable instructions, data structures, program modules, and other data for computer 700. Although the exemplary environment described herein employs a hard disk 728, a removable magnetic disk 732 and a removable optical disk 736, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 728, magnetic disk 732, optical disk 736, ROM 708, or RAM 710, including, by way of example, and not limitation, an operating system 714, one or more application programs 716 (e.g., multimedia application program 724), other program modules 718, and program data 720. A user may enter commands and information into computer 700 through input devices such as keyboard 738 and pointing device 740 (such as a "mouse"). Other input devices may include a audio/video input device(s) 753, a microphone, joystick, game pad, satellite dish, serial port, scanner, or the like (not shown). These and other input devices are connected to the processing unit(s) 702 through input interface(s) 742 that is coupled to bus 706, but may be connected by other interface and bus structures, such as a parallel port, game port, or a universal serial bus (USB).

A monitor 756 or other type of display device is also connected to bus 706 via an interface, such as a video adapter or video/graphics card 744. In addition to the monitor, personal computers typically include other peripheral output devices (not shown), such as speakers and printers, which may be connected through output peripheral interface 746.

Computer 700 may operate in a networked environment using logical connections to one or more remote computers, such as a remote computer 750. Remote computer 750 may include many or all of the elements and features described herein relative to computer.

As shown in FIG. 7, computing system 700 is communicatively coupled to remote devices (e.g., remote computer 750) through a local area network (LAN) 751 and a general wide area network (WAN) 752. Such networking environments are commonplace in offices, enterprise-wide computer networks, intranets, and the Internet.

When used in a LAN networking environment, the computer 700 is connected to LAN 751 through a suitable network interface or adapter 748. When used in a WAN networking environment, the computer 700 typically includes a modem 754 or other means for establishing communications over the WAN 752. The modem 754, which may be internal or external, may be connected to the system bus 706 via the user input interface 742, or other appropriate mechanism.

In a networked environment, program modules depicted relative to the personal computer 700, or portions thereof, may be stored in a remote memory storage device. By way of example, and not limitation, FIG. 7 illustrates remote application programs 716 as residing on a memory device of remote computer 750. It will be appreciated that the network connections shown and described are exemplary and other means of establishing a communications link between the computers may be used.

CONCLUSION

Some of the above described methods and systems can provide for start code emulation prevention at a level that is other than the bit level. This is advantageous because it can ease processing complexity. Additionally, some embodiments provide a straight forward method for data stuffing that can ensure that an integer number of bytes are sent when desired. Further, various embodiments can provide for start code emulation prevention at bit-shifted positions that do not necessarily coincide with data boundaries. Yet other embodiments can achieve various processing efficiencies while providing a mechanism by which data boundary alignment can be recovered in the event it is lost. Yet other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
receiving encoded data comprising at least one start code in a data stream;
recovering byte alignment based on location of a start code at a byte boundary in the received data, wherein the encoded data results from an encoder using a characteristic pattern of plural bytes as a search pattern for conducting start code emulation prevention data insertion on the encoded data to prevent start code emulation at every bit-shifted position relative to one or more byte-aligned locations;
searching, at the one or more byte-aligned locations in the received data, for a pattern of plural bytes comprising a start code emulation prevention byte for preventing start code emulation;
responsive to finding the pattern of plural bytes comprising the start code emulation prevention byte in the received data, removing the start code emulation prevention byte from the received data.

2. The method of claim 1, wherein the encoded data comprises video data.

3. The method of claim 1, wherein the encoded data comprises audio data.

4. The method of claim 1, wherein the encoded data comprises audio/video data.

5. One or more computer-readable media embodying instructions which, when executed by one or more processors, cause the one or more processors to implement the method of claim 1.

6. The method of claim 1 wherein the characteristic pattern has plural zero-value bytes and no non-zero value bytes.

7. The method of claim 1 wherein the pattern of plural bytes comprising the start code emulation prevention byte is equal to a replacement pattern used by the cacoder during the start code emulation prevention data insertion.

8. The method of claim 1 wherein the pattern of plural bytes comprising the start code emulation prevention byte comprises:
at least two bytes each equal to zero; and
the start code emulation prevention byte.

9. The method of claim 1 wherein the start code emulation prevention byte is equal to 0x03.

10. The method of claim 1 wherein the start code comprises a start code prefix.

11. The method of claim 10 wherein the start code prefix comprises a string of plural consecutive 0s.

12. The method of claim 10 wherein the start code prefix comprises a string of plural consecutive 0s followed immediately by a 1.

13. The method of claim 1 wherein the location of the start code is indcated by a string of 31 consecutive 0s followed immediately by a 1.

14. The method of claim 1 wherein the characteristic pattern has three zero-value bytes.

15. One or more computer-readable media having stored thereon computer-executable instructions for causing one or more computers to perform a method comprising:
receiving encoded data comprising at least one start code in a data stream;
recovering byte alignment based on location of a start code at a byte boundary in the received data, wherein the encoded data results from an encoder using a characteristic pattern of plural bytes as a search pattern for conducting start code emulation prevemtion data insertion on the encoded data to prevent start code emulation at every bit-shifted position relative to one or more byte-aligned locations;

searching, at the one or more byte-aligned locations in the received data, for a pattern of plural bytes comprising a start code emulation prevention byte for preventing start code emulation; and if the pattern of plural bytes comprising the start code emulation prevention byte is found in the received data, removing the start code emulation prevehtion byte from the received data.

16. The computer-readable media of claim 15 wherein the encoded data comprises video data.

17. The computer-readable media of claim 15 wherein the characteristic pattern has plural zero-value bytes and no non-zero value bytes.

18. The computer-readable media of claim 15 wherein the pattern of plural bytes comprising the start code emulation prevention byte is equal to a replacement pattern used by the encoder during the start code emulation prevention data insertion.

19. The computer-readable media of claim 15 wherein the pattern of plural bytes comprising the start code efmuiation prevention byte comprises:

at least two bytes each equal to zero; and
the start code emulation prevention byte.

20. The computer-readable media of any of claim 15 wherein the start code emulation prevention byte is equal to 0x03.

21. The computer-readable media of claim 15 wherein the start code comprises a start code prefix.

22. The computer-readable media of claim 21 wherein the start code prefix comprises a string of plural consecutive 0s.

23. The computer-readable media of claim 21 wherein the start code prefix comprises a suing of plural consecutive 0s followed immediately by a 1.

24. The computer-readable media of claim 15 wherein the location of the start code is indicated by a string of 31 consecutive 0s followed immediately by a 1.

25. The computer-readable media of claim 15 wherein the characteristic pattern has three zero-value bytes.

26. A method comprising:

searching for one or more search patterns in data being encoded, each of the one or more search patterns including plural bytes; and if one of the one or more search patterns is found in the data being encoded, replacing the found pattern with a replacement pattern in an encoded data stream, the replacement pattern comprising data in the found pattern along wit an emulation prevention byte for preventing start code emulation;

wherein a characteristic pattern of plural bytes is used as one of the one or more search patterns for conducting start code emulation prevention data insertion on the data being encoded to prevent start code emulation at every bit-shified position relative to one or mom byte-aligned locations, thereby facilitating recovery of byte alignment at a decoder based on location of a start code at a byte boundary.

27. The method of claim 26 wherein the encoded data comprises video data.

28. The method of claim 26 wherein the characteristic pattern has plural zero-value bytes and no non-zero value bytes.

29. The method of claim 26 wherein each of the one or more search patterns comprises at least three bytes.

30. The method of claim 29 wherein the at least three bytes comprise:

at least two bytes each equal to zero; and
a byte in which each of the byte's six most-significant bits is 0.

31. The method of claim 26 wherein the emulation prevention byte is equal to 0x03.

32. The method of claim 26 wherein the characteristic pattern of plural bytes comprises three bytes each equal to zero.

33. The method of claim 26 wherein the start code comprises a start code prefix, and wherein the start code prefix consists of two bytes each equal to 0x00 followed immediately by a byte equal to 0x01.

34. The method of claim 26 wherein the data-boundary-alignment recovery at the decoder comprises searching for a four-byte pattern consisting of a byte equal to zero followed immediately by a three-byte start code prefix at one or more bit-shifted positions relative to a byte boundary.

35. One or more computer-readable media having stored thereon computer-executable instructions for causing one or more computers to perform a method comprising:

searching for one or more search patterns in data being encoded, each of the one or more search patterns including plural bytes; and if one of the one or more search patterns is found in the data being encoded, replacing the found pattern with a replacement pattern in an encoded data stream, the replacement pattern comprising data in the found pattern along with an emulation prevention byte for preventing start code emulation;

wherein a characteristic pattern of plural bytes is used as one of the one or more search patterns for conducting start code emulation prevention data insertion on the data being encoded to prevent start code emulation at every bit-shifted position relative to one or more byte-aligned locations, thereby facilitating recovery of byte alignment at a decoder based on location of a start code at a byte boundary.

36. The method of claim 35 wherein the encoded data comprises video data.

37. The method of claim 35 wherein the characteristic pattern has plural zero-value bytes and no non-zero value bytes.

38. The method of claim 35 wherein each of the one or more search patterns comprises at least three bytes.

39. The method of claim 38 wherein the at least three bytes comprise:

at least two bytes each equal to zero; and
a byte in which each of the byte's six most-significant bits is 0.

40. The method of claim 35 wherein the emulation prevention byte is equal to 0x03.

41. The method of claim 35 wherein the characteristic pattern of plural bytes comprises three bytes each equal to zero.

42. The method of claim 35 wherein the start code comprises a start code prefix, and wherein the start code prefix consists of two bytes each equal to 0x00 followed immediately by a byte equal to 0x01.

43. The method of claim 35 wherein the data-boundary-alignment recovery at the decoder comprises searching for a four-byte pattern consisting of a byte equal to zero followed immediately by a three-byte start code prefix at one or more bit-shifted positions relative to a byte boundary.

* * * * *